May 11, 1926.

F. BATES 1,584,598

SIGNAL

Filed Nov. 21, 1924

Frank Bates INVENTOR

Patented May 11, 1926.

1,584,598

UNITED STATES PATENT OFFICE.

FRANK BATES, OF COALGATE, OKLAHOMA.

SIGNAL.

Application filed November 21, 1924. Serial No. 751,383.

This invention relates to a signal for motor vehicles, the general object of the invention being to provide a simple and efficient signal for closed types of automobiles or any other vehicle.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
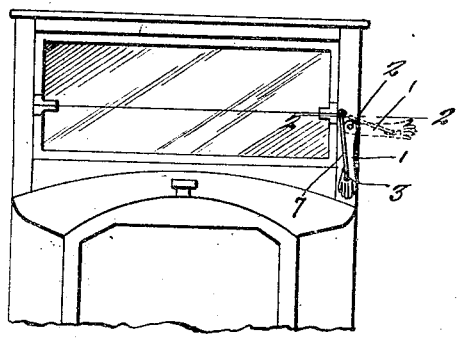
Figure 1 is a front view of a motor vehicle showing the invention in use.
Figure 2:
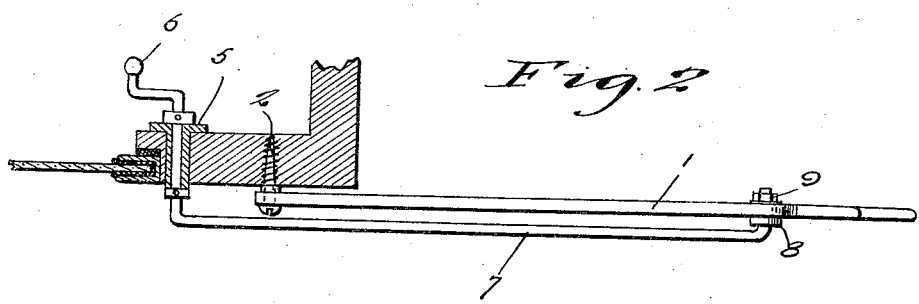
Figure 2 is an enlarged sectional view on line 2—2 of Figure 1.
Figure 3:
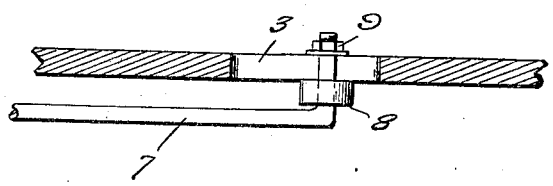
Figure 3 is a sectional detail view through the signal arm.

In these views, 1 indicates a signal arm which is preferably made in the shape of a human hand and this arm is pivoted to the front part of the vehicle body by the screw 2. The arm is provided with a slot 3. A crank shaft 4 is rotatably supported in the front of the body by a bearing 5 which is placed in a hole formed in said front. The inner end of this crank shaft is provided with a handle 6 and its outer end has an extension 7 thereon which has its extremity bent and passed through the slot 3 in which it is held by the washer 8 and the nut 9, the nut engaging the threaded end on the bent part.

From the foregoing it will be seen that the parts under the action of gravity will normally occupy a position with the arm 1 resting in vertical position in front of the body of the vehicle, as shown in full lines in Figure 1. When the vehicle is to make a turn or is to stop the operator would grasp the handle 6 and give it a partial turn so as to raise the extension 7 and the arm 1 to the dotted position of Figure 1. After the turn has been made the handle is given a reverse movement to move the parts to their normal inoperative position.

Thus I have produced a simple and effective signal which will take the place of the hand of the operator in giving signals so that it is not necessary for the operator to keep his window down in order to extend his arm.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A signal for a closed type of vehicle, comprising a signal arm pivoted to a part of the vehicle and having a slot therein adjacent its outer end, a bearing bushing in the vehicle adjacent the pivotal point of the arm, a shaft journaled in the bushing and having a handle on its inner end, a right angle extension on the outer end of the shaft which has its extremity bent to engage the slot in the arm and a nut and washer on said bent extremity for frictionally connecting the same with the arm.

In testimony whereof I affix my signature.

FRANK BATES, M. D.